June 21, 1966 P. L. M. VAN BERKEL ET AL 3,257,545

METHOD OF RECORDING MARKS AND METHOD AND DEVICE FOR SCANNING THESE MARKS

Filed July 21, 1959 2 Sheets-Sheet 1

INVENTORS.

*Petrus Ludovicus Maria van Berkel*
*Hendrik Cornelis Anthony van Duuren*
By [illegible]
*Att'ys.*

INVENTORS
Petrus Ludovicus Maria van Berkel
Hendrik Cornelis Anthony van Duuren
By Baum Jackson Bottcher & Dienner
Att'ys.

3,257,545
Patented June 21, 1966

3,257,545

METHOD OF RECORDING MARKS AND METHOD AND DEVICE FOR SCANNING THESE MARKS

Petrus Ludovicus Maria van Berkel, Voorburg, and Hendrik Cornelis Anthony van Duuren, Wassenaar, Netherlands, assignors to De Staat der Nederlanden, ten deze Verlegenwoordigd door de Directeur-Generaal der Posterijen, Telegrafie en Telefonie, The Hague, Netherlands Filed July 21, 1959, Ser. No. 828,646
Claims priority, application Netherlands, July 24, 1958, 229,899
5 Claims. (Cl. 235—61.12)

The invention relates to an information-bearing means for use with data processing machines which include visual readable characters and a number of vertical stripes which are placed in combination with the characters to provide signals in a self-checking code as scanned by the equipment in the data processing machine.

The placement of visual readable characters accompanied by vertical or horizontal stripes on documents to be processed by machine is set forth in detail in the British specification No. 785,605. However, in such arrangement the coding destined for machine handling of the signals is entirely contained in the long and short stripes which are included on the documents, and the arrangement does not contemplate or involve machine reading of the visual readable characters thereon.

A disadvantage of such system exists in the fact that the five stripes which are used only for coding must be printed close together, and as a result some difficulty has been experienced in the manufacture of type wheels, or type hammers, which are capable of printing the stripes on the documents without overlapping of the stripes. Further, since the stripes are of a reduced length the vertical tolerance is small, and a small variation in the alignment of the paper renders a correct scanning difficult, if not impossible.

A solution to such shortcomings has been set forth in the British specification No. 793,102. However, such arrangement also has certain disadvantages which are undesirable. As in the previous system, the information, intended for the human eye is contained in the characters, whereas the information intended for the machine is represented by the stripe code (two-out-of-six code in the illustrated embodiment). However, the scanning must be effected at right angles to the direction of the movement of the paper and an information channel having a larger band width is therefore required, which in turn results in a larger signal-to-noise ratio than in the case of scanning in the direction of movement of the paper. As an alternative, scanning may be effected in the direction of movement of the paper, but such arrangement requires an increased number of reading stations. Moreover, the system described is fundamentally a synchronous system.

Other systems are known in which the visual readable signal contains the information for use by the human eye and for the machine. In most known systems, however, the tolerances in the vertical direction are very small, and the code often retains too little redundance to be self-checking (see, for example, German patent specifications 708,462 and 714,685).

It is an object of the present invention, therefore, to provide information-bearing means in which the aforementioned shortcomings are avoided, and particularly to an arrangement in which the information-bearing means includes vertical elements of styled visual readable characters (also referred to hereinafter as "character elements") in combination with coding stripes (i.e., gating elements) to provide a number of "$n$" rows for scanning purposes, each row being comprised of a number of "$m$"

columns per character to provide a code for each character consisting of $n \times m$ elements. The total of the coding stripes associated with all the rows indicates for all these rows together, a number of $n$ scanning moments per signal, at which moments the combination of a vertical element placed in a column and an associated coding stripe yields a marking element and any different combination provides a spacing element, the coding stripes and the styling of the characters (gate elements and character elements) in combination, providing a code which is self-checking.

Strong accentuation of vertical portions of the styled signals, as shown in the figures, provide an ample tolerance in the printing and in the paper transport in a vertical direction this tolerance being of the same order as the length of the vertical elements. Moreover, a very good signal-to-noise ratio is obtained in the scanning device, so that the highest possible scanning speed is achieved, and the problems of adapting the speeds of the flow of the coded documents and the flow of information in the data processing machines used are reduced to a minimum.

If a document has to be provided with information not intended for general knowledge (as is the case with certain instructions), it suffices to print of the visually readable characters only the character or vertical elements that are essential for the coding, i.e., those accompanied by a gating stripe.

The invention will now be described in detail, reference being had to the annexed drawings, in which.

The printing of the figures is preferably done by means of an electric typewriter, the inking-ribbon of which is used only once. Thus a constant quality of the figures is insured. In principle, letters could also be recorded in an analogous manner. For this purpose, however, the code must be considerably refined.

Figure 1:
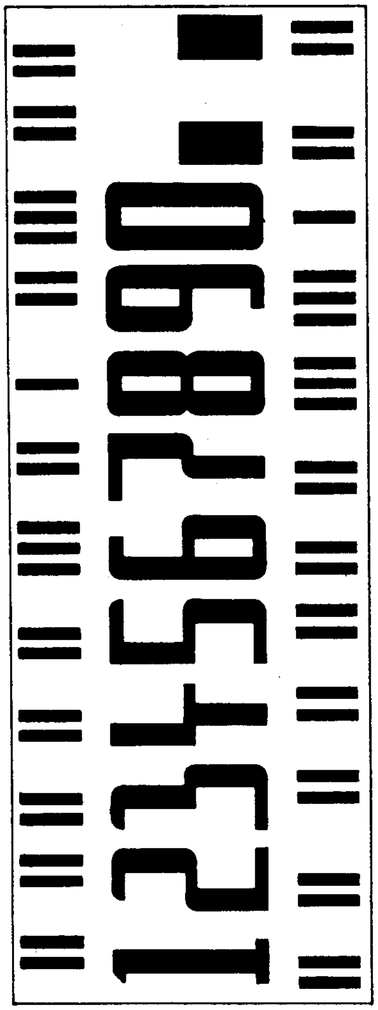
FIGURE 1 shows a first set of figures and gating stripes above and below, for the reading of the upper and the lower halves of the figures, respectively.
Figure 2:
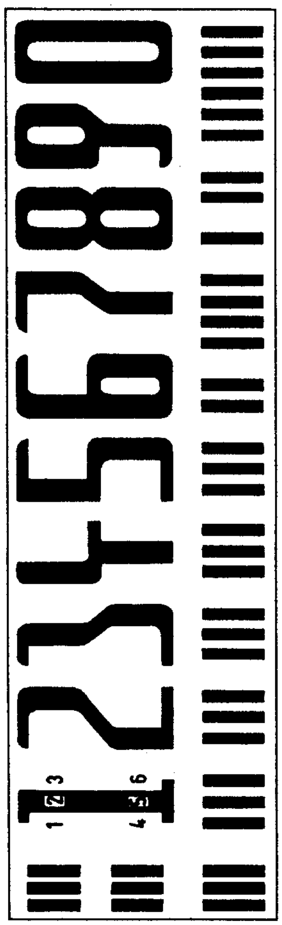
FIGURE 2 shows a variant of FIGURE 1, in which the gating stripes are placed only below the figures and serve simultaneously the reading of both the upper and lower halves of the numerals and figures.
Figure 5:
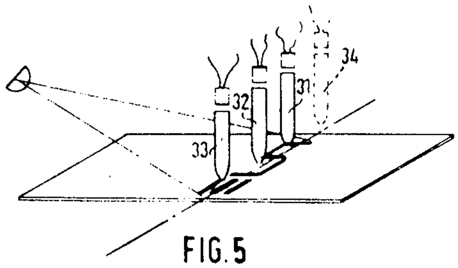
FIGURE 5 shows a reading device.

The following description is based on the recording and reading of numerals and figures in which scanning is effected in two rows ($n=2$). As will be apparent, scanning may be carried out in a larger number of rows, if desired, in which case a larger number of gating stripes may be provided. With reference now to FIGURES 1 and 2, it will be seen that the figures are read by means of two photocells, one of which scans in succession the places 1, 2 and 3, the other scanning in succession the places 4, 5 and 6, and a third, and, if necessary, a fourth photocell, scan the gating stripes (FIGURE 5).

The numerals or figures of FIGURE 1 are easy to read and, consequently, to check by the human eye. The gating stripes placed above and below the numerals control gates (not shown) for the scanning in the upper row and in the lower row, respectively. Upper and lower gating stripes together always indicate three scanning moments.

Figure 3:
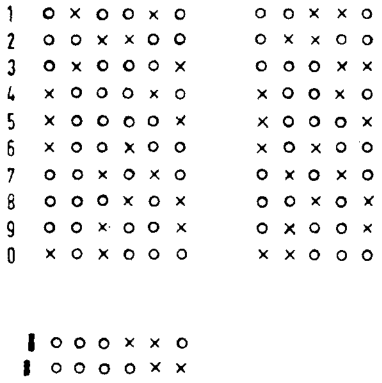
FIGURE 3 shows a self-checking code obtained from the figures according to FIGURE 1.
Figure 4:
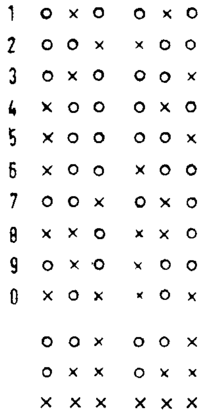
FIGURE 4 shows a self-checking code obtained from the figures according to FIGURE 2.

Scanning of the numerals and figures in two parallel rows results in the codes of FIGURES 3 and 4, first column (for figures as shown in FIGURES 1 and 2, respectively). The first group of three symbols behind each numeral or figure represents the three scanning results obtained in the upper half of the figures (places 1, 2 and 3), and the second group of three symbols represents the results obtained from the scannings in the lower row. If a vertical column is not accompanied by a gating stripe, the scanning result is always 0 (e.g. the first place from the left above the numeral 1 and the numeral 2 in FIGURE 1, [place 1] and the right-hand place below numerals 1, 2, 6, place 3 above the numeral 3 and numeral 4, and place 4 below these numerals.)

In the given example, the reading takes place from the left to the right. The codes according to FIGURES 3 and 4 admit of a simple check for errors, as each signal in FIGURE 4 contains 4 or 2 marking elements (crosses) and each signal in FIGURE 3 contains two marking elements. In these codes a simple disturbance cannot cause a wrong interpretation. The code can be converted into a two-out-of-five code as shown in the right hand side of FIGURE 3.

The two lower rows in FIGURE 3 indicate the codings for the limiting points of the illustrated series of figures in FIGURE 1. They have no equivalents in the two-out-of-five code.

Character synchronization in FIGURE 1 is obtained from the coinciding upper and lower gating stripes, e.g., in the case of numeral 2 from the first stripe in the upper row (column 2) coinciding with the last in the lower row (column 2). An entirely empty interval between two coinciding upper and lower gating stripes may only occur at the second step of the figure scanning. If there is a full marked column between the two stripes, the combination is used as a synchronizing signal (see the 1), if there is no neighboring combination of upper and lower stripes. Otherwise (as with the 6 and the 9), it is disqualified in behalf of the latter one.

With the figures according to FIGURE 2 there is only one row of gating stripes provided below the figures, which stripes serve the scanning of the upper row of vertical elements of the characters as well as that of the lower row. In this case, too, the gating stripes always indicate three scanning moments. To obtain the correct code, some columns lying outside the figure are indicated by gating stripes (cf. FIGURES 2 and 4 for the 6, the 8 and the 9).

At the bottom of FIGURE 4 three variations are shown which do not correspond to any character. The lowest can be used for the non-significant 0 (the most left character in FIGURE 2); the two others can be used as start signals ("begin of record"). The code is not a pure two-out-of-six-code, since with the figures 8 and 0 the ratio is inverted. The characters of FIGURE 1 have an important advantage over those of FIGURE 2 in that they yield a pure two-out-of-six code (FIGURE 3), which, consequently, is self-checking.

The scanning is carried out with reflected light (FIGURE 5). FIGURE 5 shows an arrangement with separate cells 31 and 32 for the upper and lower figure halves, a cell 33 for the lower row of gating stripes and a (dotted) cell 34 for the upper row of gating stripes for scanning characters according to FIGURE 1. Since scanning apparatus is well known in the art, only brief reference is made thereto.

In FIGURE 5 a black surface portion causes a marking element at the output of the scanning device, providing the associated gating cell (33 or 34) finds a black surface portion as well. If one of the surface portions scanned simultaneously is white, the reading device delivers a spacing element.

A form printed with figures of this series is moved through the reading device from right to left. The stripe lying most at the right, together with the figure elements lying above it, serve to mark the reading moments at which the scannings are effected at half the height of the lower and upper halves of the characters.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. Information bearing means for use with data processing means including a plurality of adjacent scanning areas, each of which is divided into a plurality of "*m*" vertical columns and "*n*" horizontal rows to provide $n \times m$ scanning elements for each area, a visually-readable character in at least one area, predetermined portions of the character being preassigned for location in predetermined elements of an area, at least one gating position in each column for locating a gating stripe, a gating stripe being included at the position in a column which also includes a vertical element of a character to provide, in combination, a first class of signal, and a vertical element or a gating stripe being omitted from the column to provide a second class of signal, the gating stripes and vertical elements in the columns for each of a plurality of different characters being arranged to provide the same predetermined total number of signals for each character on the information bearing means as scanned.

2. Information bearing means for use with data processing means including a plurality of adjacent scanning areas, each of which is divided into "*m*" vertical columns and "*n*" horizontal rows to provide $n \times m$ scanning elements for each area, a visually-readable character in at least one area, predetermined portions of the character being preassigned for location in predetermined elements of an area, at least one gating position in each column for locating a gating stripe, a gating stripe being included at the position in a column which also includes a vertical element of a character to provide, in combination, a first class of signal, and a vertical element or a gating stripe being omitted from the column to provide a second class of signal, the gating stripes and vertical elements in the columns for each of a plurality of different characters being arranged to provide a predetermined total number of signals and the same predetermined fixed ratio of said first and second signals for each character, the total number and fixed ratio for each of the different characters being the same to thereby provide a self-checking code.

3. Information bearing means for use with data processing means including a plurality of adjacent scanning areas, each of which is divided into a plurality of "*m*" vertical columns and "*n*" horizontal rows to provide $n \times m$ scanning elements for each area, a visually-readable character in at least one area, predetermined portions of the character being preassigned for location in predetermined elements of an area, at least one gating position in each column for locating a gating stripe, a gating stripe being included at the position in a column which also includes a vertical element of a character to provide, in combination, a marking signal, and a gating stripe or a vertical element being omitted from the column to provide a space signal, the gating stripes and vertical elements in the columns for each of a plurality of different characters being arranged to provide the same predetermined total number of marking and spacing signals and the same predetermined fixed ratio of said marking and space signals for each character, the total number and fixed ratio of marking and space signals for each of the different characters being the same to thereby provide a self-checking code.

4. Information bearing means for use with data processing means including a plurality of adjacent scanning areas, each of which is divided into a plurality of "*m*" vertical columns and "*n*" horizontal rows to provide $n \times m$ scanning elements for each area, a visually-readable character in at least one area, predetermined portions of the character being preassigned for location in predetermined elements of an area, a plurality of rows of gating positions for locating gating stripes, a gating stripe being included in each vertical column, at least one gating stripe being provided in combination with a vertical element to provide a first class of signal, and a gating stripe or a vertical element being omitted in one row in the column to provide a second class of signal, the gating stripes and vertical elements in the columns for each of a plurality of different characters being arranged to provide the same predetermined total number of signals for each character.

5. Information bearing means for use with data processing means including a plurality of adjacent scanning areas, each of which is divided into three vertical columns and two horizontal rows to provide six scanning elements for each area, a visually-readable character in at least one area, predetermined portions of the character being preassigned for location in predetermined elements of an area, at least one gating position in each column for locating a gating stripe, a gating stripe being included at the position in a column which also includes a vertical element of a character to provide, in combination, a marking signal, and a gating stripe or a vertical element being omitted in the column to provide a space signal, the gating stripes and vertical elements in the columns for each of a plurality of different characters being arranged to provide the same predetermined total number of marking and spacing signals and the same predetermined fixed ratio of said marking and spacing signals for each character, the total number and fixed ratio of marking and spacing signals for each of the different characters each character, the total number and fixed ratio of mark-

References Cited by the Examiner

UNITED STATES PATENTS

| | | | |
|---|---|---|---|
| 2,786,400 | 3/1957 | Peery | 340—149 X |
| 2,861,507 | 11/1958 | Palmer | 340—15 X |
| 2,889,535 | 6/1959 | Rochester | 340—149 |
| 2,942,778 | 6/1960 | Broido | 235—61.11 |
| 2,980,801 | 4/1961 | Reumerman | 250—106 |

MALCOLM A. MORRISON, *Primary Examiner.*

EVERETT R. REYNOLDS, IRVING L. SRAGOW, *Examiners.*